United States Patent
Serrano et al.

[11] Patent Number: 6,078,445
[45] Date of Patent: Jun. 20, 2000

[54] GAIN CONTROL FOR A DUAL BURST, DUAL FREQUENCY PES SERVO PATTERN

[75] Inventors: Louis Joseph Serrano; Mantle Man-Hon Yu, both of San Jose, Calif.

[73] Assignee: International Business Machines Corporation, Armonk, N.Y.

[21] Appl. No.: 08/908,779

[22] Filed: Aug. 7, 1997

[51] Int. Cl.[7] .................................................. G11B 5/09
[52] U.S. Cl. ............................ 360/46; 360/67; 360/77.08
[58] Field of Search ................................. 360/67, 65, 46, 360/77.08, 78.14, 77.02, 77.04; 324/212, 226

[56] References Cited

U.S. PATENT DOCUMENTS

| | | | |
|---|---|---|---|
| 4,048,660 | 9/1977 | Dennison et al. | 360/77.08 |
| 4,551,776 | 11/1985 | Roalson | 360/77.02 |
| 4,890,172 | 12/1989 | Watt et al. | 360/69 X |
| 5,121,260 | 6/1992 | Asakawa et al. | 360/25 X |
| 5,408,373 | 4/1995 | Bajorek et al. | |
| 5,453,887 | 9/1995 | Negishi et al. | 360/77.08 X |

OTHER PUBLICATIONS

C.H. Bajorek, E. Harden and N.J. Mazzeo, "Large Surface Air Bearing for a Flexible Disc File", *IBM TDB*, vol. 18, No. 11, Apr. 1976, 3859–60.

M. Barlow, M.A. Church, R.E. Jones, Jr. and T.H. Yeh, "Thin Film Magnetic Head Assembly", *IBM TDB*, vol. 24, No. 4, Sep. 1981, 1912–13.

D.M. Jones, "Parallel Servo–Track Write and Read Verification with Side–By–Side Inductive Head Elements", *IBM TDB*, vol. 26, No. 8, Jan. 1984, 4243–44.

*Primary Examiner*—Alan T. Faber
*Attorney, Agent, or Firm*—Gray Cary Ware Friedenrich

[57] ABSTRACT

Real-time gain control calibration is provided for each frequency of a disk drive storage system using dual-frequency, dual-burst position error sensing (PES) signals. Automatic and independent gain control for each PES servo burst frequency component is achieved with an automatic gain control (AGC) mapping that determines the approximate head position and performs an appropriate gain calibration for each servo burst frequency or with sector by sector normalization performed for each PES signal sample. For the AGC mapping, calibration is performed either with calibration tracks or with an in situ method. Both mapping and normalization methods provide accurate automatic gain calibration during signal readback.

21 Claims, 11 Drawing Sheets

GAIN CONTROL FOR A DUAL BURST, DUAL FREQUENCY PES SERVO PATTERN

BACKGROUND OF THE INVENTION

1. Field of the Invention

This invention relates generally to magnetic head servo control systems and, more particularly, to disk drive position control systems that determine the location of a head relative to disk tracks.

2. Description of the Related Art

In a conventional computer data storage system having a rotating storage medium, such as a magnetic or magneto-optical disk system, data is stored in a series of concentric or spiral tracks across the surface of the disk. A magnetic disk for example, can comprise a disk substrate having a surface on which a magnetic material is deposited. The digital data stored on a disk is represented as a series of variations in magnetic orientation of the disk magnetic material. The variations in magnetic orientation, generally comprising reversals of magnetic flux, represent binary digits of ones and zeroes that in turn represent data. The binary digits must be read from and recorded onto the disk surface in close proximity to the disk. That is, a read/write head can produce and detect variations in magnetic orientation of the magnetic material as the disk rotates relative to the head.

Conventionally, the read/write head is mounted on a disk arm that is moved across the disk by a servo. A disk drive servo control system controls movement of the disk arm across the surface of the disk to move the read/write head from data track to data track and, once over a selected track, to maintain the head in a path over the centerline of the selected track. Maintaining the head centered over a track facilitates accurate reading and recording of data in the track. Positioning read/write heads is one of the most critical aspects of recording and retrieving data in disk storage systems. With the very high track density of current disk drives, even the smallest head positioning error can potentially cause a loss of data that a disk drive customer wants to record or read. Accordingly, a great deal of effort is devoted to servo systems.

A servo control system generally maintains a read/write head in a position centered over a track by reading servo information recorded onto the disk surface. The servo information comprises a position-encoded servo pattern of high frequency magnetic flux transitions, generally flux reversals, that are pre-recorded in disk servo tracks. The flux transitions are recorded as periodic servo pattern bursts formed as parallel radial stripes in the servo tracks. When the read/write head passes over the servo pattern flux transitions, the head generates an analog signal whose repeating cyclic variations can be demodulated and decoded to indicate the position of the head over the disk. The position indicating information can be used to produce a corrective signal that is referred to as a position error sensing (PES) signal. The PES signal indicates which direction the head should be moved to remain centered over a track and properly read data.

There are a variety of methods for providing servo track information to a disk servo control system. In a method referred to as the dedicated servo method, the entire surface of one side of a disk is pre-recorded with servo track information. A servo head is positioned over the dedicated servo disk surface in a fixed relationship relative to data read/write heads positioned over one or more other data disk surfaces. The position of the servo head relative to the dedicated disk surface is used to indicate the position of the multiple data read/write heads relative to their respective disk surfaces. The dedicated servo method is most often used with multiple disk systems in which a servo head of a single dedicated servo disk surface controls movement of corresponding data read/write heads of a multiple platter disk drive.

Another method of providing servo track information is known as the sector servo method. In the sector servo method, each disk surface includes servo track information and binary data recorded in concentric or spiral tracks. The tracks on a sector servo disk surface are partitioned by radial sectors having a short servo track information area followed by a data area. The servo track information area typically includes a sector marker, track identification data, and a servo burst pattern. The sector marker indicates to the data read/write head that servo information immediately follows in the track. The servo read head is typically the same head used for reading data.

In both the dedicated servo and sector servo types of systems, the PES signal is used to generate a corrective input signal that is applied to the read/write head positioning servo. The remaining description assumes the sector servo system, but the manner in which the servo control system could be applied to a dedicated servo system will be readily apparent to those skilled in the art.

FIG. 1 is a representation of servo track information pre-recorded into a track 20 of a conventional disk 22 for an exemplary servo sector and data field. An initial field in the track comprises a synchronization field 24, such as for automatic gain control (AGC) or similar signal detecting purposes. The next field in the track is a track identification field 26, typically comprising a digitally encoded gray code. Next is a PES pattern field 28, generally containing a servo pattern burst, as described above. The next field in the track is a customer data synchronization field 30 for permitting read circuitry to adjust to the data amplitude and frequency, which may differ from those of the servo information. The data synchronization field 30 is followed by a customer data field 32.

FIG. 2 is a representation of a conventional disk drive quad-burst PES pattern in which magnetic transitions are recorded on the disk surface in bursts labeled as A, B, C, and D. The servo pattern bursts move relative to a disk drive magnetic head (not illustrated) from right to left. The disk data tracks and half-track positions are indicated by the track numbers along the left side of the FIG. 2 drawing. The portion of the disk 22 shown in FIG. 2 extends approximately from track N−1.0 toward the inner diameter of the disk to half-track N+2.5 toward the outer diameter. Those skilled in the art will appreciate that position information is decoded by demodulating the signal generated by the head passing over the PES burst patterns to form a signal P based on:

$$P = A - C$$

and to form a quadrature signal Q based on:

$$Q = B - D.$$

The signals P and Q are quadrature signals because they are cyclic and are out of phase by 90 degrees (one-quarter phase). The magnetic transitions that comprise the PES pattern are represented in FIG. 2 by vertical bars. The letter within each group of bars represents the PES burst recorded therein. One burst is distinguished from another by relative position in a track and relative position to the other bursts. Thus, for a read head that can detect magnetic transitions from more than one track at a time, the signal P should be zero when tracking exactly along the centerline of track N, because the head will detect equal amounts of magnetic field from the A and C servo bursts. A similar situation exists for tracks N+1, N+2. and so forth for tracks that are an even number multiple of half-tracks from N. For the half track position N+0.5, the signal Q should be zero when tracking exactly along the N+0.5 half-track line, because the head will detect equal amounts of field from the B and D servo bursts. The signal Q should be zero also for half-track positions N+1.5, N+2.5, and so forth.

The signal processing to which the servo readback signal is subjected includes demodulation and decoding of servo information and also includes automatic gain adjustment, to ensure that the readback signal is of relatively constant amplitude regardless of where the read/write head is relative to a track centerline or relative to the surface of the disk. The signal processing circuitry of the disk position control system includes a variable gain amplifier to perform automatic gain control (AGC). The AGC function is performed using an AGC data field contained in each servo sector. When the read/write head is over the AGC data field, the magnitude of the signal produced from the data field is examined and the gain of the variable gain amplifier is adjusted to provide a predetermined constant amplitude signal. In this way, processing gain variation for the associated servo demodulation circuitry can be eliminated, at least for readback signals of servo pattern bursts recorded at the frequency of the AGC data field pattern. Accordingly, most AGC data fields are recorded at the same frequency as the servo pattern bursts.

Some disk storage systems utilize dual frequency servo patterns. In a disk storage system with a dual frequency servo pattern, some of the servo bursts are recorded at a first frequency and the remaining servo bursts are recorded at a second frequency. The primary advantage claimed for dual frequency servo patterns is that they require less disk surface area. Nevertheless, such servo patterns typically do not provide performance that is as good as quad burst patterns in providing half-track position information.

To properly determine head position in a dual frequency disk storage system, it is typically necessary to provide a separate signal processing circuit for each servo pattern frequency. The signal processing functions performed for each circuit include filtering so the individual components of the quadrature signals can be distinguished for demodulation. In a single frequency system, the A and C servo bursts are distinguished in time, that is, by circumferential offset. In a dual frequency system, A and C are read at the same time and are distinguished via signal filter processing. The read/write head continuously receives the readback signal, and the filter processing determines which spectral portion of the received readback signal is part of which servo burst. Thus, processing circuits for each frequency receive the readback signal and produce the original bursts. This presents a problem because no single AGC pattern can be used for automatic gain control calibration for both frequencies. Therefore, the gain in the respective signal processing circuits for the two servo pattern frequencies cannot be automatically adjusted using the AGC field on the disk. More complicated systems must be used.

It is important for the readback signal processing of each frequency of a dual frequency system to be carefully gain-controlled. If the gains are off, the centerline of the track following operation will be incorrect. The zero value of the PES, which usually corresponds to the track center, will instead be offset from the track center. Adjusting the signal gain during readback is important because the relative gain of the readback signal can change with disk fly height. The disk fly height is a measure of how high above the disk surface the read head is traveling. With a single frequency PES servo pattern, any fly height variation in the readback signal can be calibrated out with AGC processing and the variable gain amplifier described above. With a dual frequency servo pattern, it is impossible to eliminate all calibration error using conventional AGC processing. At most, only one of the servo pattern frequencies can be calibrated using the AGC field, because both P and Q components of the readback signal are being received at the same time, and at most one of the PES servo pattern frequencies is equal to the frequency of the AGC field. Thus, it is very difficult to automatically correct the gain for the readback signal produced from demodulating both of the servo pattern bursts.

From the discussion above, it should be apparent that there is a need for a dual frequency disk drive storage system that can perform accurate and reliable automatic gain control during readback for both servo frequencies, and that can respond to variations in disk fly height for proper gain calibration in the signal demodulator. The present invention fulfills this need.

SUMMARY OF THE INVENTION

The present invention provides independent, real-time gain control calibration of each position error sensing (PES) signal in a disk servo control system that generates dual-frequency readback signals. In accordance with the invention, automatic and independent gain control for each frequency of the servo readback signal component is achieved using a mapping that determines the approximate head position and performs an appropriate gain calibration for each servo burst frequency based on the servo readback signal. Alternatively, the gain control calibration can be performed for each readback signal sample, a technique referred to as normalization. In this way, disk drive systems with dual frequency servo patterns are ensured of independent, accurate automatic gain calibration of each frequency during signal readback.

In one aspect of the invention, AGC mapping is achieved with calibration tracks comprising two conventional, single frequency, quad burst servo patterns interspersed with dual frequency, dual burst servo patterns for which gain control is to occur. The servo pattern bursts of the first of the calibration tracks are recorded at the frequency of the first of the dual burst servo patterns, and the servo pattern bursts of the other calibration track are recorded at the frequency of the second of the dual burst servo patterns. Known techniques for gain calibration of single frequency, quad burst servo patterns are then used to calibrate the two single frequency calibration patterns, which will necessarily calibrate the respective frequencies of the associated dual frequency servo patterns.

In another aspect of the invention, AGC mapping for a dual frequency, dual burst servo pattern is achieved with an in situ method that forms a sum E, where:

$$E=(A+C)-(B+D)$$

and P and Q are the PES signal and PES quadrature terms formed from the A, B, C, and D readback signal samples, and both A and B are of the same frequency and both C and D are of the same frequency. An iterative process is then followed to move the readback head to a position where P is equal to Q and then the sum E is driven to zero.

In yet another aspect of the invention, a normalization technique is used for each sample of the servo readback signal by forming the sum E as described above for the readback signal samples and then by using conventional single frequency normalization techniques.

Other features and advantages of the present invention should be apparent from the following description of the preferred embodiments, which illustrate, by way of example the principles of the invention.

DESCRIPTION OF THE PREFERRED EMBODIMENTS

The preferred embodiments of the present invention will be described with reference to a servo control system for a sector servo dual-frequency, dual-burst servo pattern. It should be appreciated, however, that the present invention has application to a wide variety of dual frequency disk servo control systems.

1. Dual Frequency, Dual Burst Servo Pattern

Figure 3:
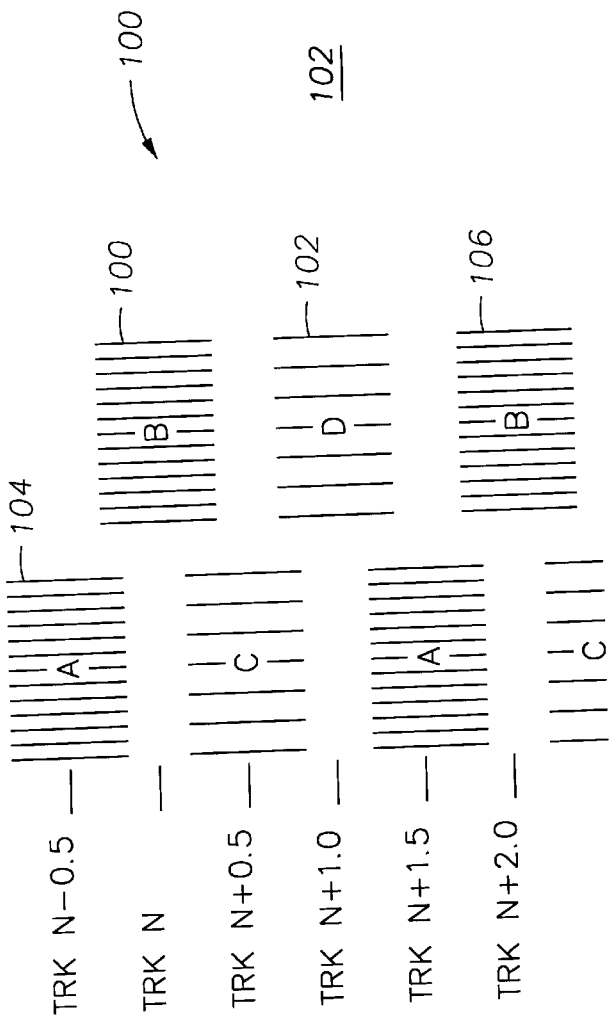
FIG. 3 is a representation of a two-frequency, dual burst PES pattern of a disk storage system constructed in accordance with the present invention.

FIG. 3 is a representation of a dual frequency, dual burst servo pattern 100 recorded in a servo sector on a disk surface 102 constructed in accordance with the present invention. It should be understood that the portion of the servo pattern illustrated in FIG. 3 represents only a part of a servo sector of the disk. In FIG. 3, disk tracks run side to side horizontally across the page and the servo pattern magnetic transitions are represented by fields of vertical bars with an upper case letter designating a recorded servo pattern burst. The different frequencies of the bursts is indicated by the differential spacing of the bursts designated by the upper case letters.

For example, FIG. 3 shows a quadrature servo pattern that is formed by bursts comprising A, B, C, and D; the pattern is represented by vertical bar fields labeled A, B, C, and D, arranged so that A and C form a "P" signal and B and D form a "Q" signal that is in quadrature with the P signal. The A and B fields are transitions recorded at the same frequency and the C and D fields are transitions recorded at the same frequency, different from A and B. The data tracks and half-track positions are indicated by the track numbers along the left side of FIG. 3. The top edge 104 of the pattern illustrated in FIG. 3 represents a portion of the disk that is closer to the outside diameter of the disk relative to the bottom edge 106 of the illustrated pattern, which represents a portion of the disk that is closer to the inside diameter of the disk.

The servo pattern illustrated in FIG. 3 is described in greater detail in the U.S. patent application entitled "Compact Servo Pattern Optimized for M-R Heads" by E. Cunningham, Ser. No. 08/910,968, filed concurrently with this application.

Those skilled in the art will appreciate that position information is decoded by demodulating the servo burst patterns to form a signal P from $$P=A-C$$

and to form a quadrature signal Q from $$Q=B-D.$$

The signals P and Q are quadrature signals because they are cyclic and are out of phase by 90 degrees (one-quarter phase). The magnetic transitions that comprise the servo pattern are represented in FIG. 3 by vertical bars. The letter within each group of bars represents the servo burst recorded therein. One burst is distinguished from another by relative position in a track and to the other bursts. Thus, for a servo head that can detect magnetic transitions from more than one track at a time the signal P should be zero when tracking exactly along the centerline of track N, because the head will receive equal amounts of magnetic field from the A and C servo bursts. A similar situation exists for tracks N+1, N+2, and so forth. For half-track position N+0.5, the signal Q should be zero when tracking exactly along the N+0.5 half-track line. The signal Q should be zero also for tracks N+1.5, N+2.5, and so forth.

Figure 4:
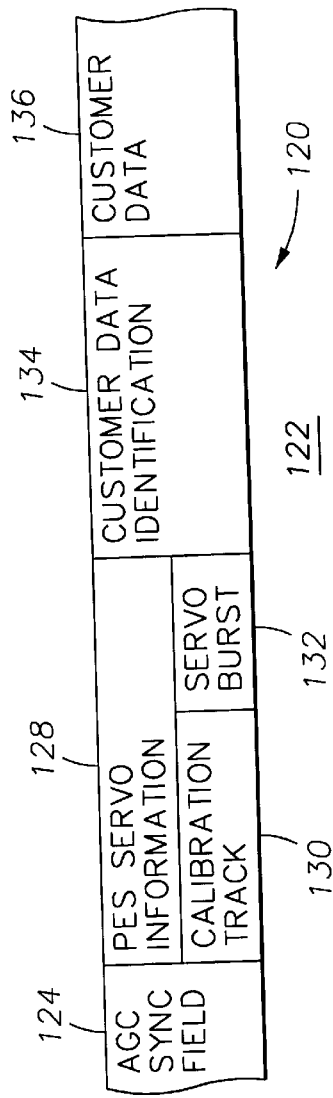
FIG. 4 is a representation of servo track information in a sector servo disk constructed in accordance with the present invention.

FIG. 4 is a representation of servo track information pre-recorded into a track 120 of a disk 122 constructed in accordance with the invention. An initial field in the track comprises a synchronization field 124, such as for automatic gain control (AGC) or similar signal detecting purposes. The next field in the track is a servo information field 128 containing an optional calibration track 130 described below and a multiple frequency servo pattern burst 132. such as described above in conjunction with FIG. 3. That is, the servo information includes servo burst patterns such as illustrated in FIG. 3. The next field in the track 120 is a customer data synchronization field 134 followed by a customer data field 136.

It should be noted that there is no explicit gray code field in the track sector 120 shown in FIG. 4. If desired, track identification information such as a binary timing mark can be recorded as part of the servo pattern field 128 to indicate a particular half or quadrant of the disk surface, as needed. The binary timing mark would provide disk position information of the type that typically would be provided by gray code data. Alternatively conventional gray code data can be provided along with the servo track information described above. A system that performs positioning control is described in the co-pending U.S. patent application entitled "Multiple Servo Track Types Using Multiple-Frequency PES Patterns" by L. J. Ser. No. 08/910,972 Serrano, filed concurrently with this application.

In accordance with the invention, automatic gain calibration of the readback servo signal is performed independently for each of the servo pattern frequencies using one of two methods, either an AGC mapping technique or a sector by sector normalization technique. The AGC mapping will be described first.

2. AGC Mapping for Each Frequency

When an AGC mapping is used for calibration, gain calibration is performed during a recalibration step of servo pattern demodulation based on an AGC mapping that is generated based on the disk system design. More particularly, characteristics such as the read/write head fly height profile across the surface of the disk are considered and the gain correction for each frequency is determined using conventional methods. The fly height is influenced, for example, by the design of the air bearing of the read/write head and the disk speed. Thus, disk storage systems that use the same read/write head design and disk operating speed will likely have the same fly height profile. Multiple gain calibration data points are selected to create the AGC map, and then interpolation is used to perform gain calibration at intermediate points. For disk locations where the fly height is known to change the most, additional AGC map data points are selected. Where the fly height is known to change least, fewer AGC map data points are selected.

For example, if the fly height of a disk system is known to change most frequently at the outer diameter of the disk and to thereby affect gain calibration, then the AGC map would have more data points at the outer diameter than toward the inner diameter. That is, the AGC map sample points would correspond to read/write head positions more closely spaced in the radial direction at the outer diameter than at the inner diameter. During readback, the approximate position of the read/write head is determined, the PES servo pattern signal is received, and the appropriate gain correction is applied to the signal samples using the AGC mapping.

Figure 5:
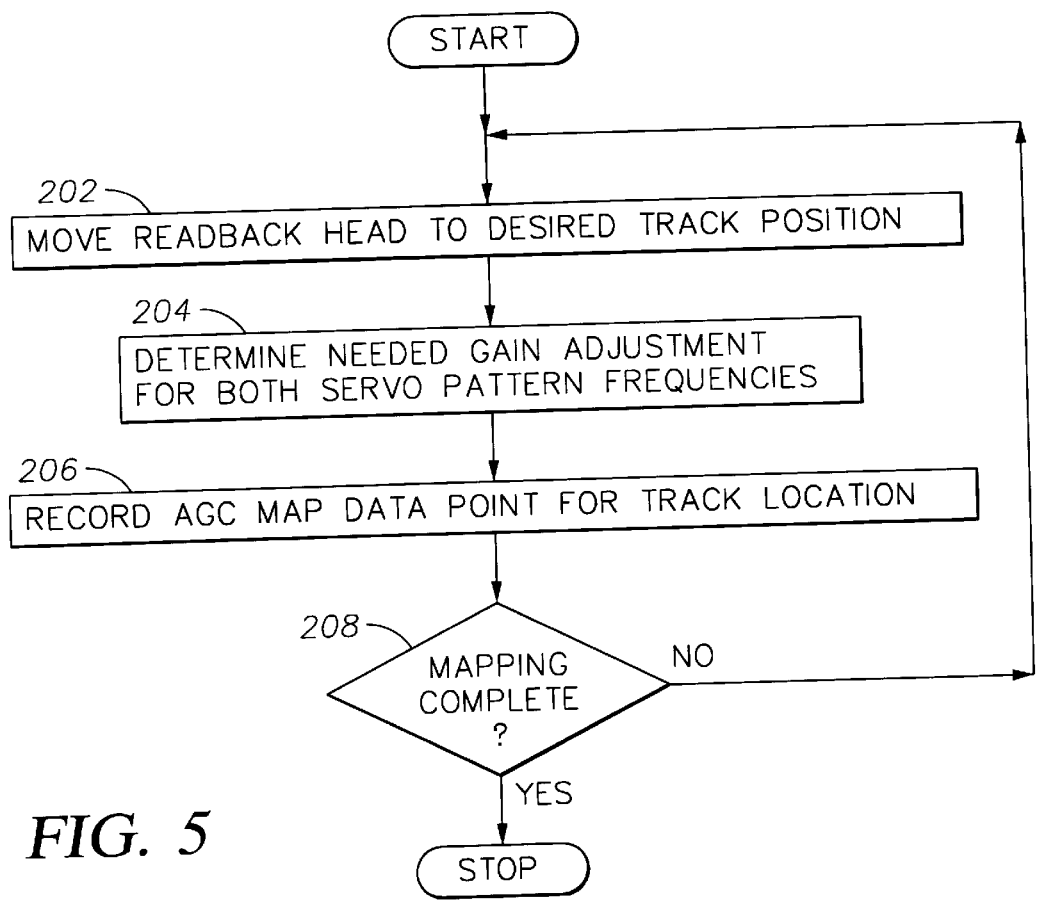
FIG. 5 is a flow diagram of the processing steps performed by a system constructed in accordance with the present invention in carrying out the AGC mapping for a system having servo tracks such as illustrated in FIG. 3.

FIG. 5 is a flow diagram that illustrates the steps performed by the disk servo control system in recording the AGC map. In the flow diagram box numbered 202, processing begins by moving the readback head to the first desired track position. For example, the position for the first track might be at the outside diameter of the disk. Next, the needed gain adjustment for both servo pattern frequencies for this position (considering, for example, disk fly height) is determined. This next step is represented by the flow diagram box numbered 204. Next, at the box numbered 206, the determined gain adjustment is recorded as an AGC map data point for the disk location of the readback head. At the decision box numbered 208, a check is made for completion of mapping. If the mapping is not complete, a negative outcome at the box 208, then the readback head is moved to the next disk mapping point, as indicated by the flow diagram box numbered 202. Disk mapping might be carried out, for example, every fifty tracks or one hundred tracks; it needn't be carried out for each track. The AGC mapping is completed (a positive outcome at the decision box 208) and the process is stopped.

When AGC mapping is to be used, one of two techniques can be applied to create and apply the AGC map to calibration: one technique that uses calibration tracks and another technique that will be referred to as the in situ method.

Calibration Tracks

With the calibration track method, modified servo pattern bursts are repeated at intervals across the disk and the readback signal is examined to determine the AGC mapping that would be appropriate. The AGC mapping is then incorporated into disk servo control system microcode for disks manufactured with components such that they have the same disk fly height profile as the disk system from which the AGC map was constructed. New AGC mapping operations may be performed on a file-by-file basis during power-up or other calibration sequences, but are not needed for disks of the same design, which therefore can make use of the same AGC map. The calibration tracks, however can subsequently be used to indicate approximate head location to determine the gain calibration value to be applied.

Figure 6:
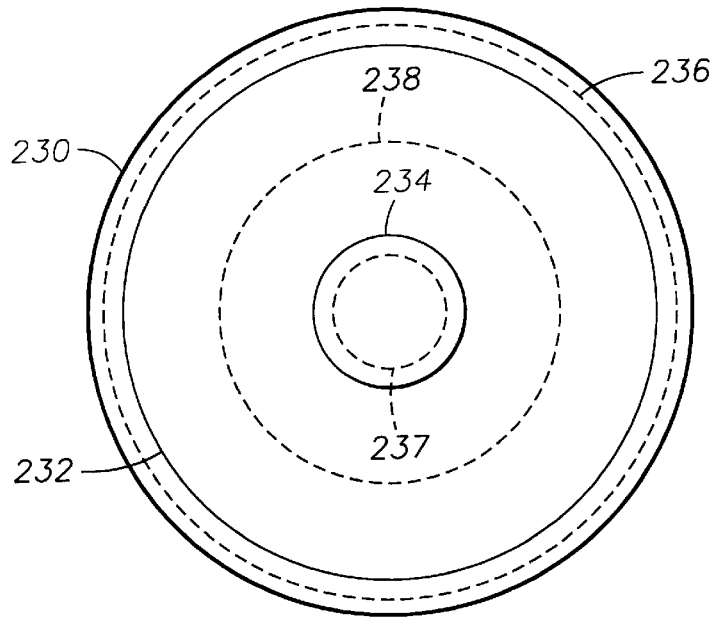
FIG. 6 is a representation of a disk constructed in accordance with the present invention, showing calibration tracks recorded on the disk.

More particularly, a calibration track comprising a modified servo pattern is recorded at several places on the disk. FIG. 6 shows a disk 230 constructed in accordance with the present invention, with the outside diameter boundary of the customer data indicated in a solid line 232 and the inner diameter boundary of the customer data indicated in another solid line 234. The locations of calibration tracks on the disk are indicated in dotted lines, one calibration track 236 located adjacent the outside diameter of the customer data, another calibration track 237 located adjacent the inner diameter of the customer data, and optionally at a mid-band calibration track 238 located in the midst of the customer data. The mid-band calibration track is optional and can be eliminated to increase the available disk storage surface area for customer data.

Figure 1:
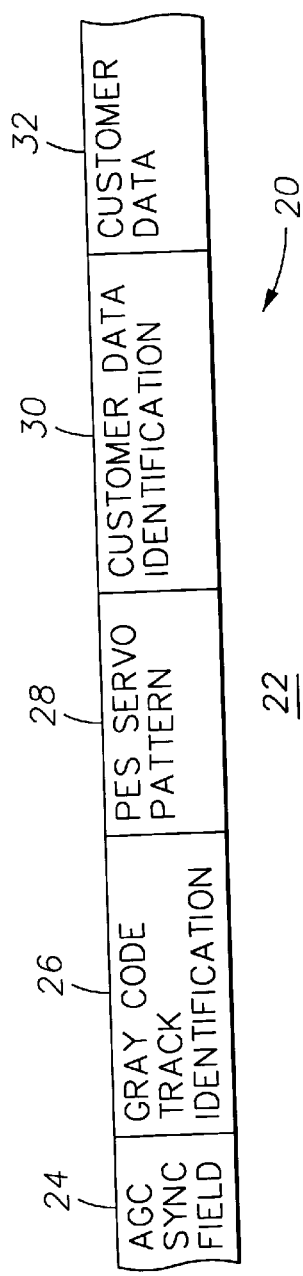
FIG. 1 is a representation of servo track information in a conventional sector servo disk.
Figure 2:
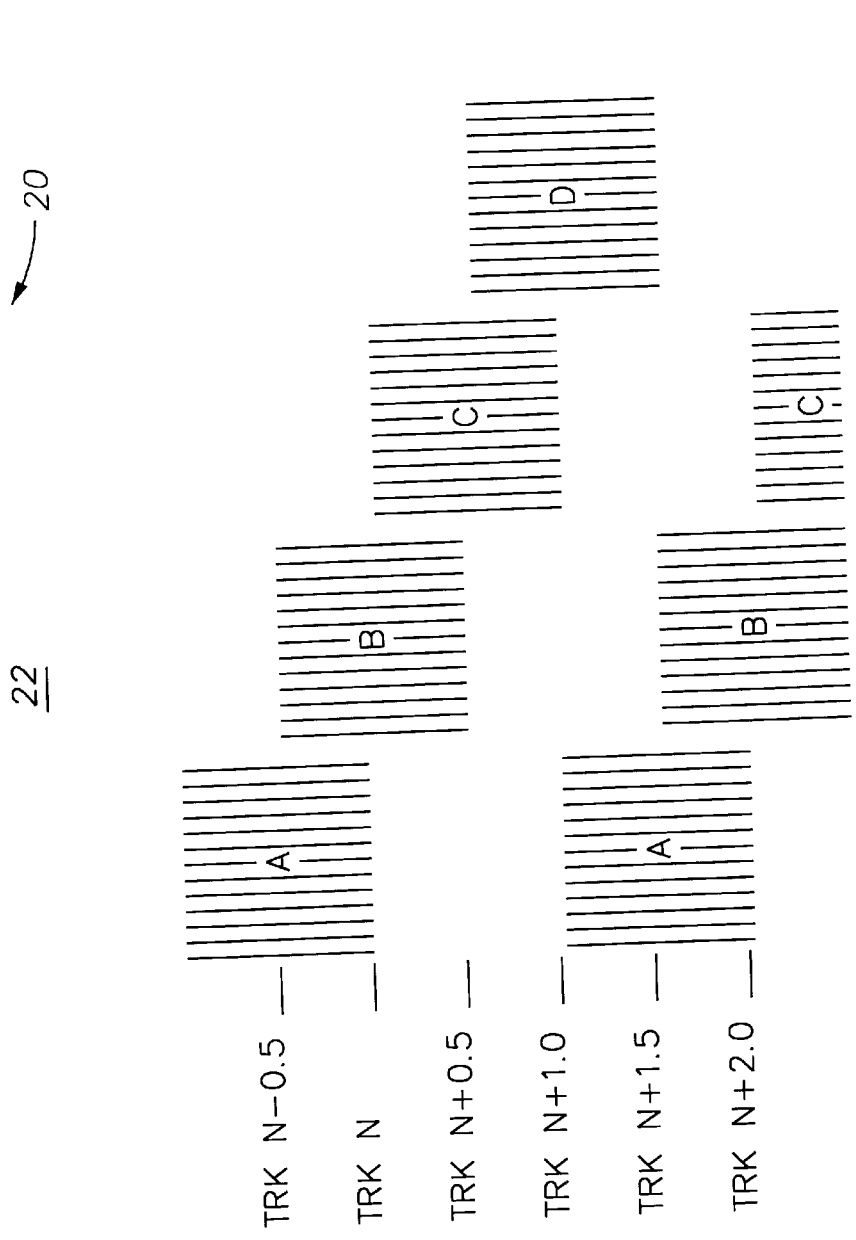
FIG. 2 is a representation of a conventional quad-burst PES pattern such as recorded into the sector servo disk of FIG. 1.

Preferably, each calibration track includes two conventional single frequency quad burst patterns. That is, first a quad burst in one frequency is recorded and then a quad burst in the second frequency is recorded. Thus, one or more servo bursts such as illustrated in FIG. 3 would be recorded first and then, where each calibration track is to be recorded, bursts such as illustrated in FIG. 2 would be recorded. Known calibration techniques employed with single frequency quad burst patterns can then be used to perform the AGC calibration for the quad burst pattern, thereby calibrating the servo pattern of the associated dual frequency, dual burst pattern such as illustrated in FIG. 3.

Figure 7:
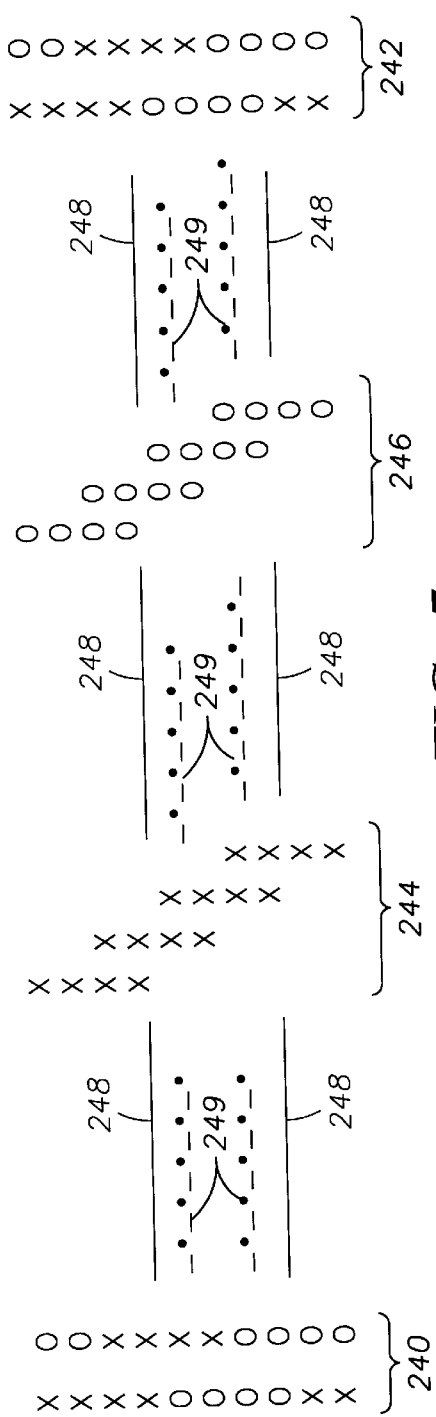
FIG. 7 is a representation of a portion of a track from FIG. 6 showing the servo track information along with calibration track information.

FIG. 7 shows a portion of a track of the disk 230 from FIG. 6 showing the contents of one of the calibration tracks 232, 234, 236. As illustrated, two dual frequency servo bursts 240, 242 are separated by two single-frequency quad burst patterns 244, 246. In FIG. 7, the "X" letters indicate a servo burst recorded at the first frequency, such as A or B in FIG. 3, and the "O" letters indicate a servo burst recorded at the second frequency, such as C or D in FIG. 3. The solid lines 248 indicate a nominal track centerline reference, for illustration, and the dotted-dashed lines 249 indicate a one-fourth track offset from centerline, for illustration. The single frequency quad burst servo patterns can be frequency calibrated using known methods.

The calibration of the gain for a single frequency quad burst servo pattern typically uses the following method steps:

TABLE 1

(0) Set G = 1, initial gain value.
(1) Move the head to a place where | |P| = |Q| (if gain is correct, then |P| = |Q| = ¼).
(2) Form the signal F = |P| + |Q|, where P = G * (A − C) and Q = G * (B − D).
(3) If F > ½, decrease G; else increase G.
(4) If |F − ½| < e, then stop; else use new G value and go to Step (2).

The processing of steps (0) through (4) is repeated for both frequencies. The value "e" in step (4) represents a predetermined error threshold value.

Figure 8:
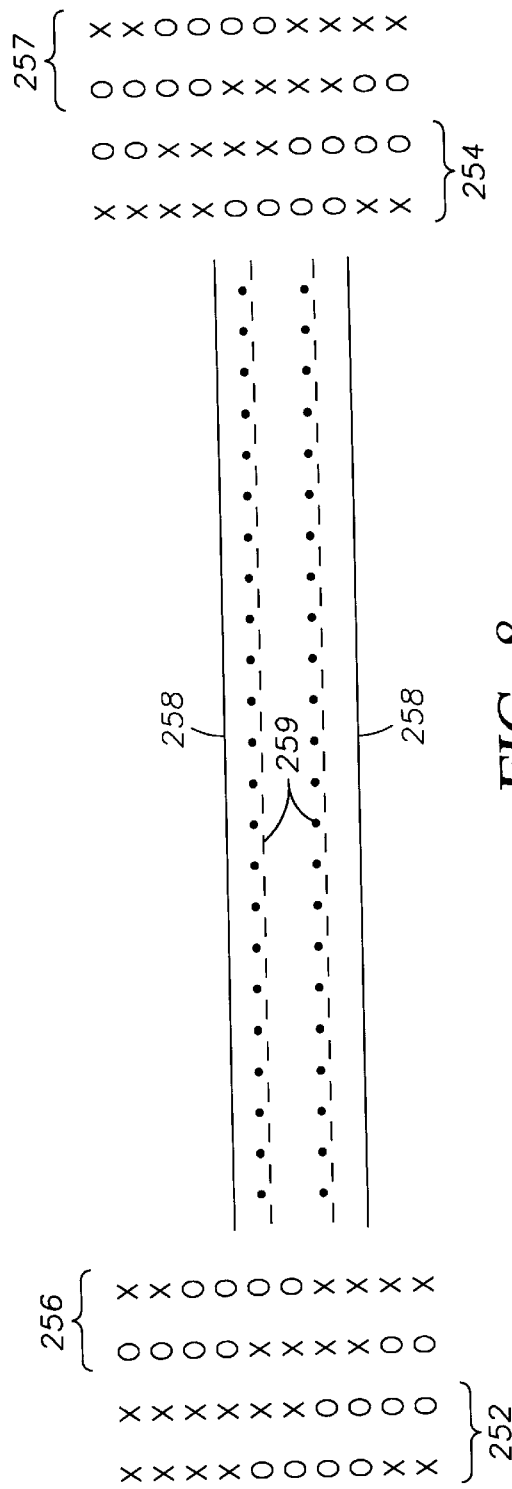
FIG. 8 is a representation of an alternative portion of a track from FIG. 6 showing the servo track information along with calibration track information.

FIG. 8 shows an alternative scheme for two-frequency AGC calibration tracks rather than the single frequency quad burst technique of Table 1. In FIG. 8, dual frequency, dual servo pattern bursts 252, 254 are spaced apart at a typical sampling time that is different from the calibration track sampling time. Also shown are inverted dual frequency, dual burst servo patterns 256, 258. The "X" letters indicate a servo burst recorded at the first frequency, such as A or B in FIG. 3, and the "O" letters indicate a servo burst recorded at the second frequency, such as C or D in FIG. 3. The solid lines 258 indicate a nominal track centerline reference, for illustration, and the dotted dashed line 259 indicates a one-fourth track offset from centerline, for illustration. The inverted bursts 256, 258 are used to calibrate relative gain by generating a position signal offset in the opposite direction. That is, a mismatch between the gains for the two frequencies will cause a position error in opposite directions between the servo pattern and its inverse. Zeroing the error will correct the relative gain between the two frequencies. The absolute gain is corrected in accordance with single frequency gain correction techniques known in the art, adapted for the invention.

Those skilled in the art will know of various gain calibration techniques for readback signals generated from single line, quad burst servo patterns. An exemplary single frequency technique adapted for use in conjunction with the present invention will be described next.

Adapted Single Frequency, Quad Burst Gain Calibration Technique

The calibration of the dual frequency quad burst pattern uses the following method steps set forth in Table 2:

TABLE 2

(0) Set G = 1, G' = 1.
(1) Move the head to a position where |P| = 0.
(2) Form a signal H = G' * (A2 − C2), where A2 and C2 are from the inverted dual burst pattern.
(3) If H < 0, increase G'; else decrease G'.
(4) If |H| < e, then go to Step (5); else go to Step (2).

TABLE 2-continued (5) Move the head to a position where |P| = |Q|.
(6) Form the signal F = |P| + |Q|, where P = G * (A − C) and Q = G * (B − D).
(7) If F > ½, then decrease G; else increase G.
(8) If |F − ½| < e, then stop; else use new G value and go to Step (6).

Figure 9:
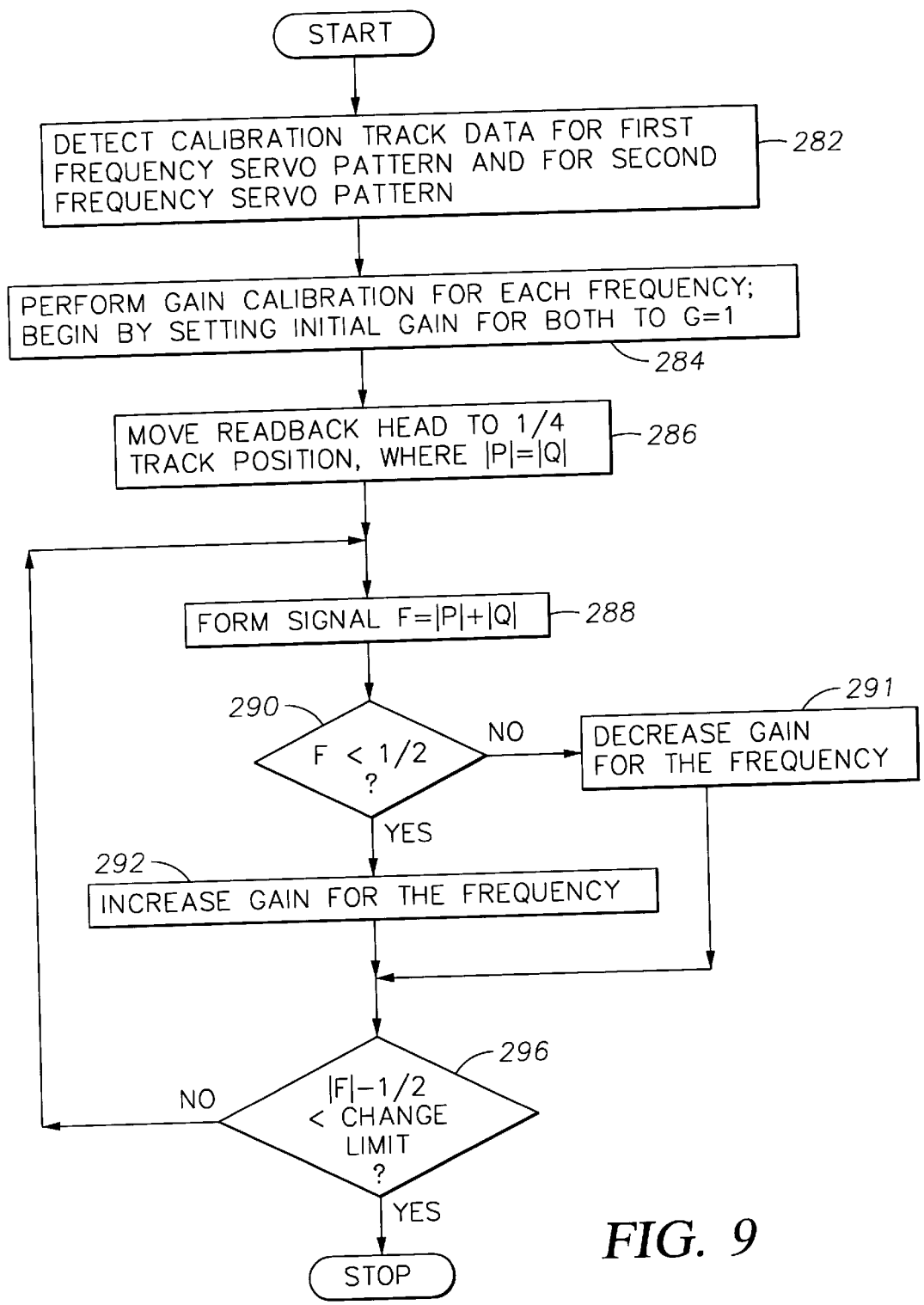
FIG. 9 is a flow diagram of the processing steps performed by a system constructed in accordance with the present invention in carrying out the AGC mapping with the calibration tracks illustrated in FIG. 6.

FIG. 9 shows the steps performed by a disk servo control system constructed in accordance with the present invention in performing a single frequency, quad burst gain calibration technique for a dual frequency, dual burst pattern. That is, the single frequency calibration steps are performed twice, once for each frequency. These steps correspond to the steps listed above in Table 2.

In the first calibration step, indicated by the FIG. 9 flow diagram box numbered 282, a calibration track is detected for each frequency. This may be achieved by detecting a combination of timing marks and relative head position information, if desired. The box numbered 284 indicates the next step: performing the gain calibration and set a gain value G for both frequencies to an initial value G=1. The processing of box 284 represents the processing of steps (1), (2), (3), and (4) of Table 2.

The next step using single-frequency gain calibration processing is to move the readback head to a location where the absolute value of the quadrature readback signal due to P is equal to the absolute value of the quadrature signal due to Q, which will be at a one-quarter track location if the readback gain is correct. That is, ideally, this absolute value will have a magnitude of one-fourth full scale value. This step is represented by the flow diagram box numbered 286 and corresponds to step (5) of Table 2.

FIG. 9 processing steps performed next correspond to steps (6), (7), and (8) of Table 2, and represent a series of adjustment steps that are repeated until the magnitude of the adjustment satisfies a change value limit number (error threshold value) selected by the system designer. The first adjustment step is represented in the FIG. 9 flow diagram by the box numbered 288 (corresponding to step (6) from Table 2), where the signal F is formed. Next, the value of F is checked at the decision box numbered 290. If F>½, then the gain G is decreased at the flow diagram box numbered 291. If F≦½, a negative outcome at the box numbered 290, then the gain G is increased at the box numbered 292. This processing corresponds to step (7) from Table 2).

After gain adjustment, the value of F, is checked against the error threshold, as represented by the flow diagram box numbered 296 (corresponding to step (8) from Table 2). In particular, if the value |F−½| is less than an error threshold value e, then gain adjustment is complete. If the error threshold has not been reached, then the gain adjustment steps are repeated, beginning with the F signal-forming step of the flow diagram box numbered 288. It should be noted that these steps are performed after relative gain error has been eliminated (that is, conventional gain balancing between the two frequencies is first completed).

In situ Technique

The in situ method permits AGC calibration using an AGC map and permits construction of the AGC map without using calibration tracks. Rather, the in situ technique generates a signal E using the servo pattern, moves the read/write head to a location in the track where P=Q, and then examines the signal E, where:

$$E=(A+C)-(B+D).$$

If the gains for the two frequencies are equal, then the sum signal E should be equal to zero. This can be appreciated by examining FIG. 3 and recognizing that, for example, at approximately the track location of track T=(N+1.75). the signal magnitude from the A burst is equal to the signal magnitude from the B burst, and the signal magnitude from the C burst is equal to the signal magnitude from the D burst. Thus, the sum signal E should be zero.

Before describing the calculation of the F signal and the steps of in situ gain control, a short discussion of the signals involved should be helpful.

First, $P_r$ and $Q_r$ signals comprising uncorrected (or raw) P and Q signal values are obtained, where:

$$P_r=(G_1*A)-(G_2*C)$$

and $$Q_r=(G_1*B)-(G_2*D).$$

A, B, C, and D are the ideal bursts with maximum full scale size equal to one and minimum size equal to zero. This should be appreciated by examination of FIG. 3 Next, values P and Q are obtained, where:

$$P=G*(G'_1*(G_1*A)-(G_2*C))$$

and $$Q=G*(G'_1*(G_1*B)-(G_2*D)).$$

In the equations immediately above, $g_1$ and $g_2$ are gains introduced by fly height changes, circuitry variations, and the like; $g_1A$ and $g_2A$ are respective observed readback signal values; $G'_1$ is a correction factor to correct the relative gain error between the first frequency (that of A and C) and the second frequency (that of B and D), and G is a correction factor to correct the absolute gain error. It should be noted that, for a single frequency PES servo pattern, $g_1=g_2$ and $G'_1=1$.

For the dual frequency situation of the present invention, the signal E is defined by:

$$E=(G_1*A)+(G_2*C)-(G_1*B)+(G_2*D)$$

and has its largest value near a readback head location where P=Q.

Figure 10:
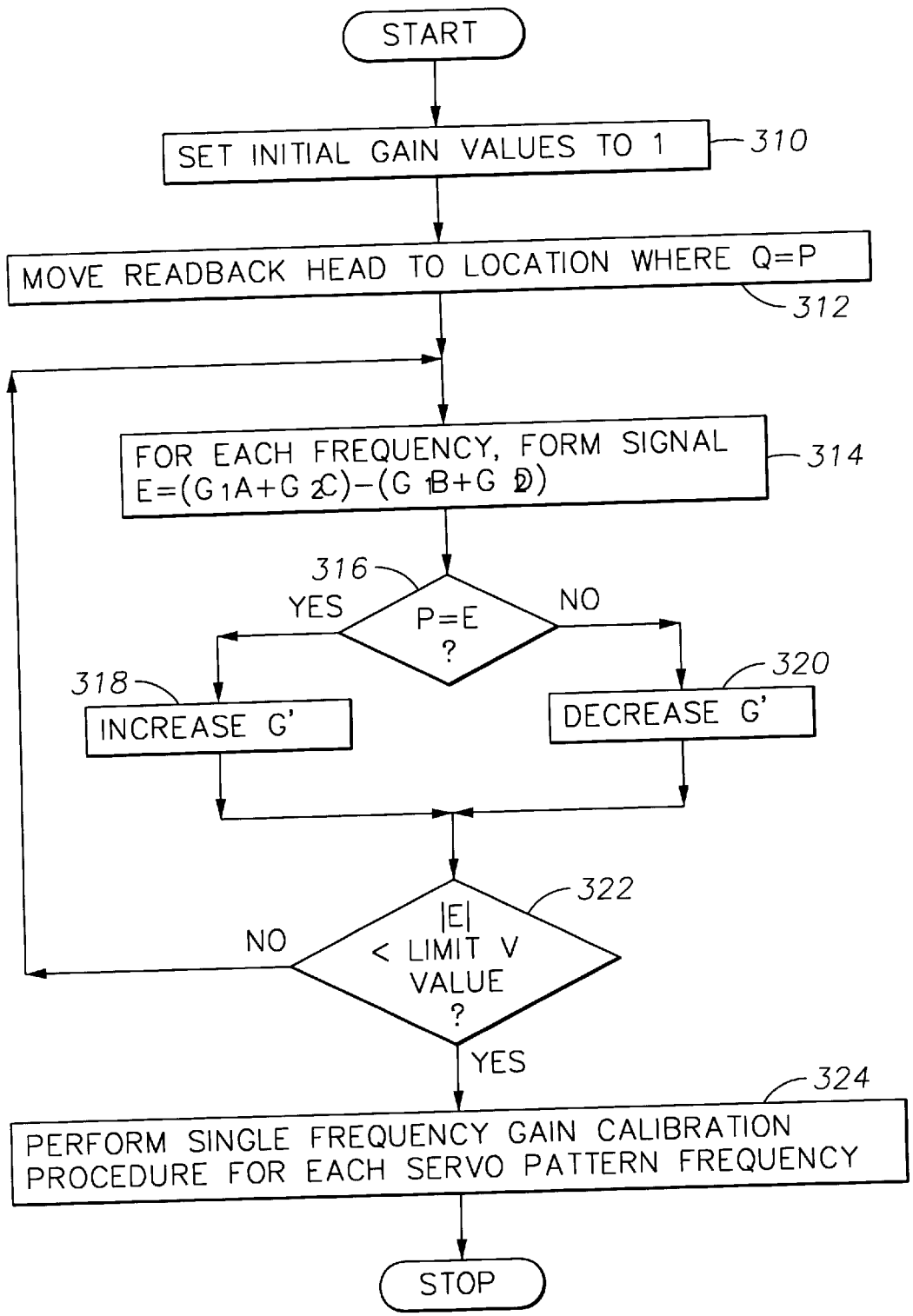
FIG. 10 is a flow diagram of the processing steps performed by a system constructed in accordance with the present invention in carrying out the AGC mapping of FIG. 5 with the in situ method.

Using the signals described above, in situ gain control is performed as follows (the steps are represented graphically in the flow diagram of FIG. 10):

(0). Set G=1 and $G'_1=1$.
(1). Move the readback head to the location where P=Q.
(2). Perform the steps of:
(2a). Form the signal E as defined above.
(2b). If the signs of P and E are equal, then increase $G'_1$, otherwise decrease $G'_1$,
repeating steps (2a) and (2b) until the absolute value of E, |E|, is within a predetermined change limit value.
(3). Move the readback head to a ¼ track location where |P|=|Q| (ideally, this will be where P and Q have an absolute value equal to ¼).
(4). Repeat the single frequency calibration technique steps of:
(4a). Form the signal F=|P|+|Q|.
(4b). If F<|$P_{nom}$|+|$Q_{nom}$|=½, then increase the value of G, otherwise decrease the value of G.
(4c). If G changes by more than a change limit value, then move the readback head to a location where $$|G*P|=¼=|G*Q|,$$

repeating steps (4a), (4b), and (4c) until the value |F−½| is within a predetermined single frequency technique change limit value.

The first step (0) is represented by the flow diagram box numbered 310, the second step (1) is represented by the flow diagram box numbered 312. The repeated step (2a) of forming the E signal is represented by the flow diagram box numbered 314. The step of checking the signs of P and E, step (2b), is represented by the flow diagram box numbered 316. An affirmative outcome from the decision box results in the gain being increased (box 318), while a negative outcome from the decision box results in the gain being decreased (box 320). Checking for the limit value to determine repeating of steps (2a) and (2b) is represented by the decision box numbered 322.

If the limit value is not reached, a negative outcome at the decision box 322, then gain adjustment is repeated by returning to the box numbered 314. If the limit value has been reached, then processing proceeds to performing a single frequency gain calibration procedure, represented by the FIG. 10 flow diagram box numbered 324 and listed above as steps (3) and (4).

Thus, the in situ technique generates a signal E=(A+C)−(B+D) using the servo pattern, moves the read/write head to a location in the track where P=Q, and then examines the signal F, and permits generating an AGC map without using calibration tracks.

3. Real-Time Monitoring of Relative Gain

Relative gain can be monitored in real time, if desired. In such processing, for each sector, values A, B, C, and D are received. It should be noted that, because of gain variation, the values actually received may be represented by the true values multiplied by a gain factor, so that the received values correspond to $g_1A$, $g_1B$, $g_2C$, and $g_2D$. The next step is to form the signal E, where $$E=(G'_1*G_1A+G_2C)-(G'*G_1B+G_2D);$$

as before, the gain $G'_1$ is increased or decreased based on the location of the head and the sign of E. Next, if the magnitude of F is sufficiently small, then E is not changed.

The PES value is next normalized using standard techniques well-known to those skilled in the art. For example, the value P may be calculated by:

$$P = \frac{G'_1 * G_1A - G_2C}{G'_1 * G_1A + G'_1 * G_1B + G_2C + G_2D}$$

Next, the E signal value is calculated, as is a figure-of-merit for the E signal value. The figure-of-merit is compared against an error limit value e. If the error limit value e is greater than the figure-of-merit, then recalibration is performed using either the in situ or calibration track methods described above. It should be noted that the E signal value, for a dual frequency system, is the relative gain between the two frequencies.

4. Position Control System

Figure 12:
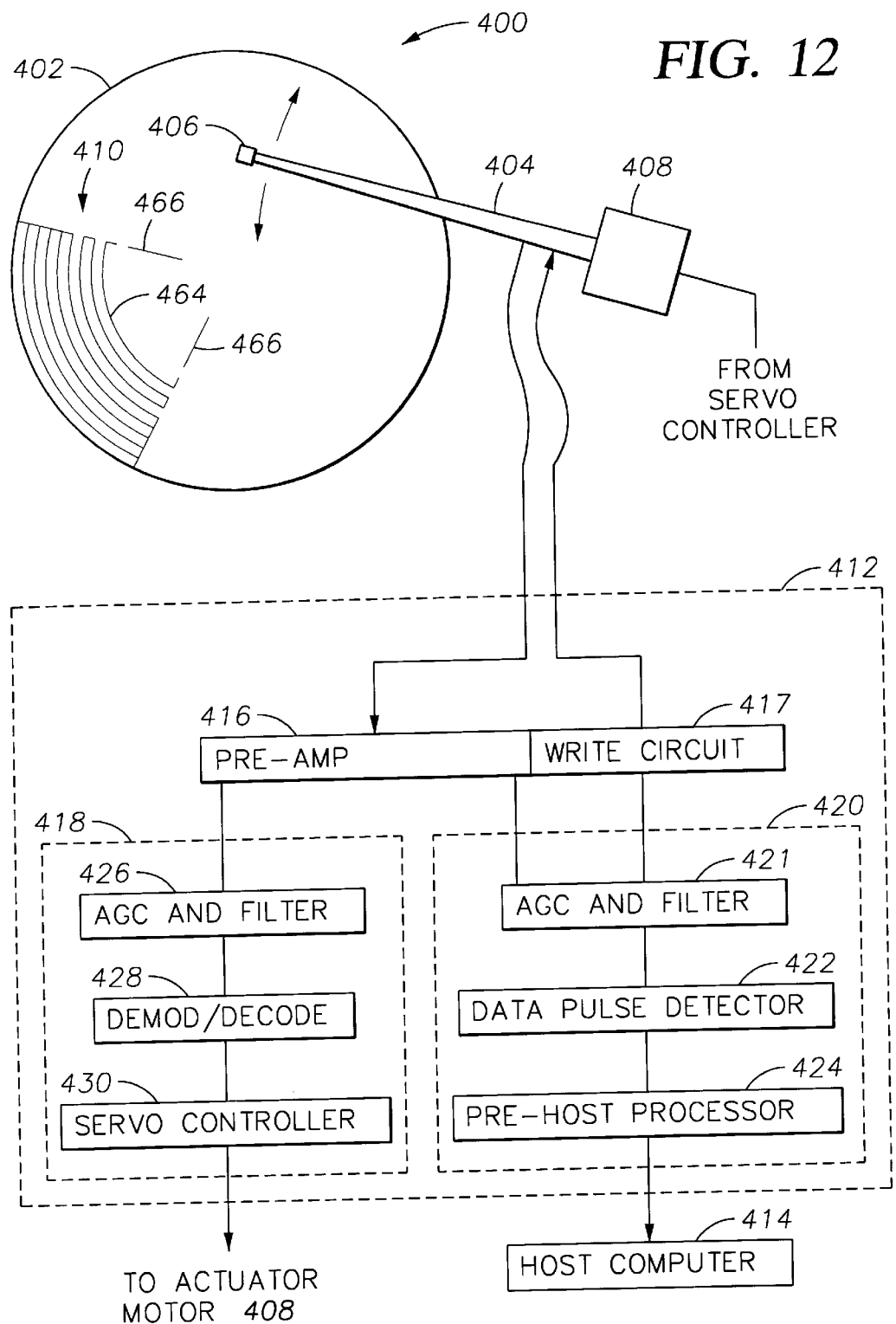
FIG. 12 is a schematic representation of a disk storage system constructed in accordance with the present invention.

The track identification scheme of the present invention is generally implemented in conjunction with a magnetic disk drive system 400, in an arrangement such as that depicted in FIG. 12. The disk drive 400 may include one or more individual disks 402 on which is deposited a magnetic recording material for storing magnetically encoded information. For case of explanation, only one disk 402 is illustrated in FIG. 12. The disk drive 400 also includes an actuator 404 with a read/write head 406. The actuator motor 408 pivots the actuator 404 under the control of a servo controller 430, thereby changing the position of the read/write head 406 with respect to concentric tracks 410 of data contained on the disk 402. Although rotary movement of the actuator 404 is depicted for illustrative purposes, the disk drive 400 may alternatively use another positioning scheme such as linear extension/retraction of the actuator 404.

Figure 11:
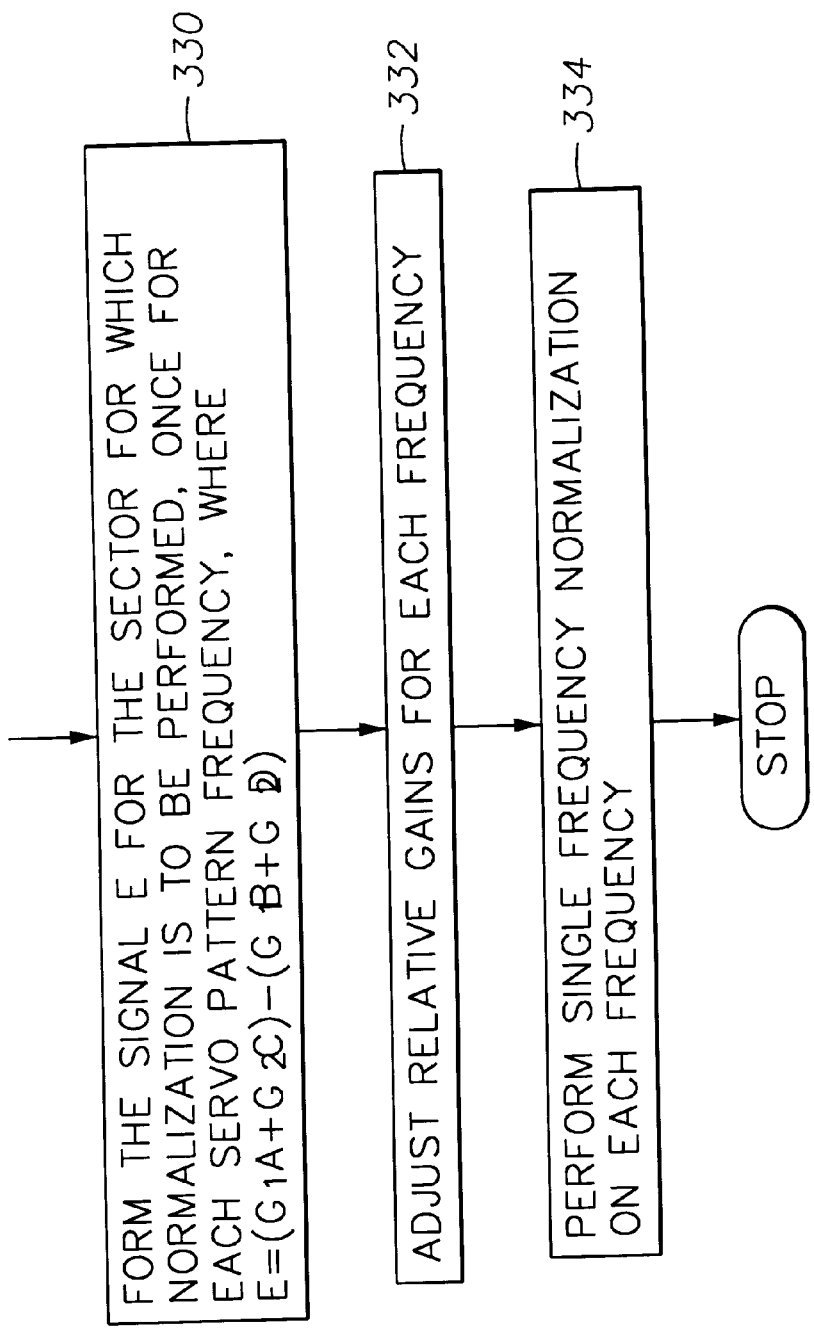
FIG. 11 is a flow diagram of the processing steps performed by a system constructed in accordance with the present invention in carrying out gain calibration in a system having dual frequency, dual burst servo patterns such as illustrated in FIG. 3 on a sector-by-sector basis.

The operation of the disk drive 400 is managed by a disk drive controller 412, which also serves as an interface between the disk drive 400 and a host computer 414. The host computer may comprise, for example, a desktop computer, a notebook computer, a mainframe computer, or other digital data processing device for which storage of data on a disk is desired. The disk drive controller 412 performs the calibration steps illustrated in FIG. 9, FIG. 10, and FIG. 11.

The controller 412 includes a readback signal preamplifier 416 ("pre-amp"), which receives electrical representations of servo patterns sensed by the read/write head 406 from the disk 402. With sector servo positioning, the pre-amp 416 preferably serves a dual purpose by amplifying either data or servo signals, depending on whether the read/write head 406 is positioned over stored customer data or servo patterns, respectively. A write circuit 417 is also provided to supply the read/write head 406 with data signals to be written to the disk 402. As an alternative to the sector servo arrangement illustrated in FIG. 10, the read/write head 406 may be used to sample servo signals from a dedicated servo surface, although the invention typically will find application only with sector servo disk drive systems.

The amplified signal from the pre-amp 416 is directed to two processing channels: a servo channel 418 and a customer data channel 420. The write circuit 417 is connected only to the data channel. The data channel 420 generally reads and writes data to and from the disk 402. in response to requests from the host computer 414 to read or write the data. When operating in conjunction with the data channel, the pre-amp 416 amplifies signals provided by the read/write head 406 that correspond to customer data stored on the disk 402. Amplified data signals from the pre-amp are then directed to an automatic gain control and filter circuit 421. Then, a data pulse detector 422 forms digital data pulses corresponding to the analog signals provided by the circuit 421. Next, a pre-host processor 424 converts the data pulses into formatted data strings that are specifically compatible with the host computer 414. The components of the data channel 420 also operate in reverse order to write data to the disk 402.

In contrast to the data channel 420, the servo channel 418 generally functions to read servo data from the disk 402 to aid in properly positioning the read/write head 406. When operating in conjunction with the servo channel 418, the pre-amp 416 amplifies servo signals produced when the read/write head 106 senses servo patterns. The servo channel 418 includes an automatic gain control (AGC) and filter circuit 426, which may comprise any one of various known circuits for automatically adjusting the readback signal gain and filtering it. Next, a demodulator/decoder 428 receives the readback signal and processes the information to derive a position error sensing (PES) signal, which is related to the position of the read/write head 406 with respect to the desired track center and is indicative of the read/write head position error. The PES signal is then used by a servo controller 430 to generate an input signal that, when provided to the actuator 404, controls the position of the read/write head 406. The actuator motor 408 may, in an exemplary embodiment, comprise a voice coil motor.

The servo pattern is recorded into, and read from, tracks across the disk 418. In FIG. 12, circular, parallel lines 464 designate servo tracks of the disk, which is divided into sectors that are represented by radial lines 466. The servo tracks can include several repeated cycles of a servo pattern and can encompass one or more tracks of customer data. Each sector includes a servo information field 328 followed by a customer data identification field 334 and a customer data field 336. After the servo pattern has been recorded and disk production is complete, a user can record and read the user's customer data from the customer data field using, for example, the system illustrated in FIG. 12.

Figure 13:
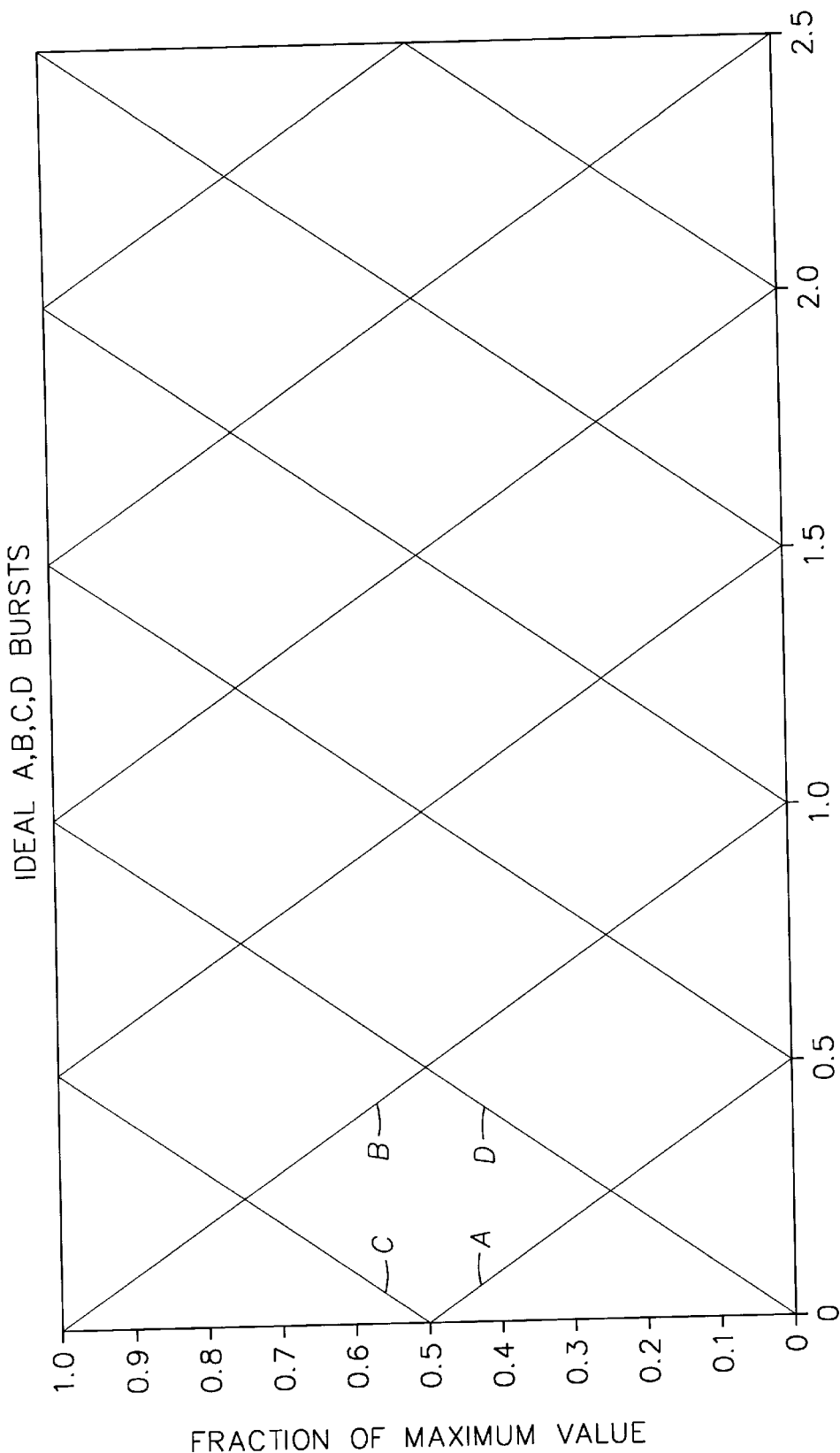
FIG. 13 is a graph that represents idealized burst value vs. track position for the servo readback signal of a disk having servo patterns such as illustrated in FIG. 3.
Figure 14:
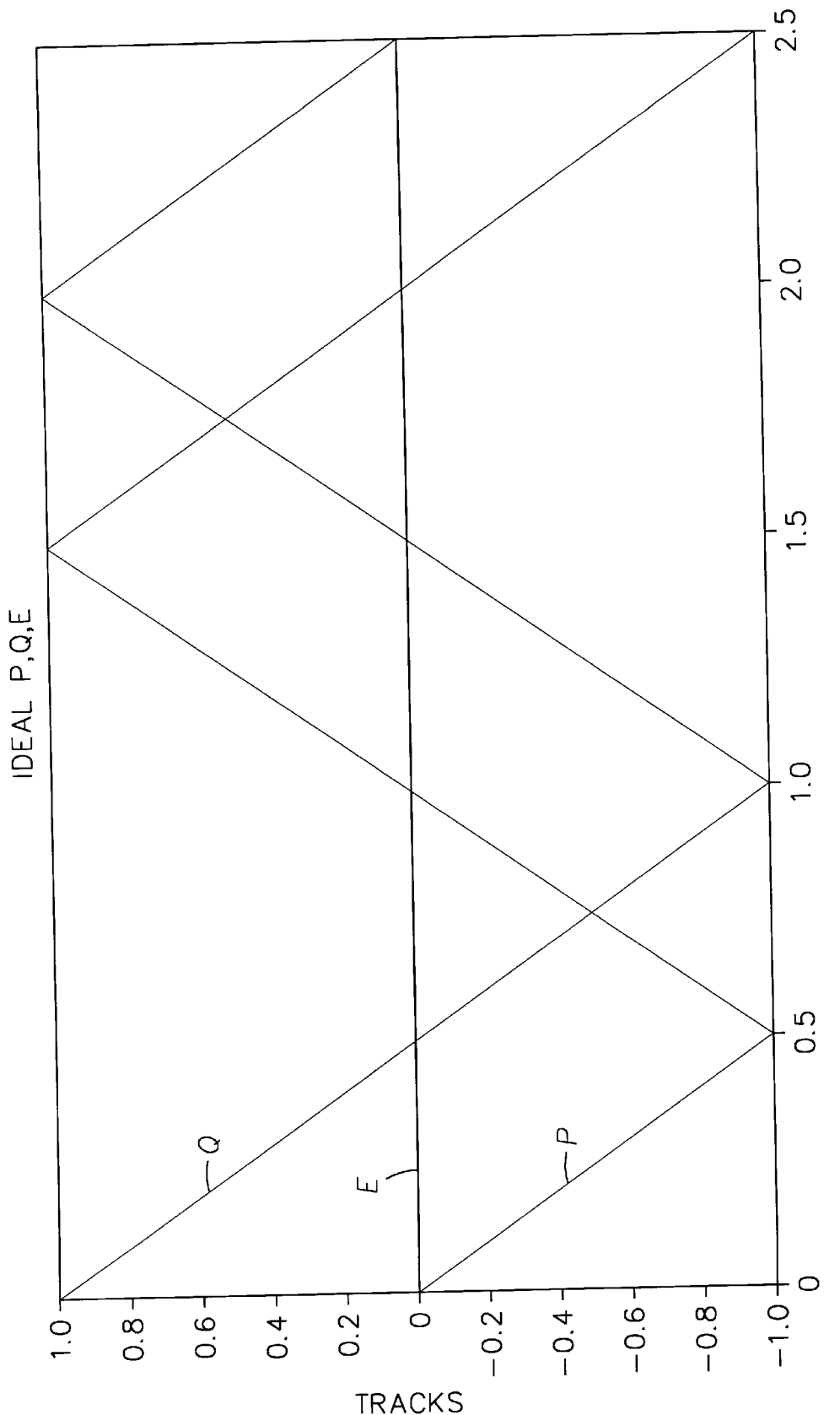
FIG. 14 is a graph that shows the ideal P, Q, and E signals following from FIG. 10, assuming ideal gain calibration.
Figure 15:
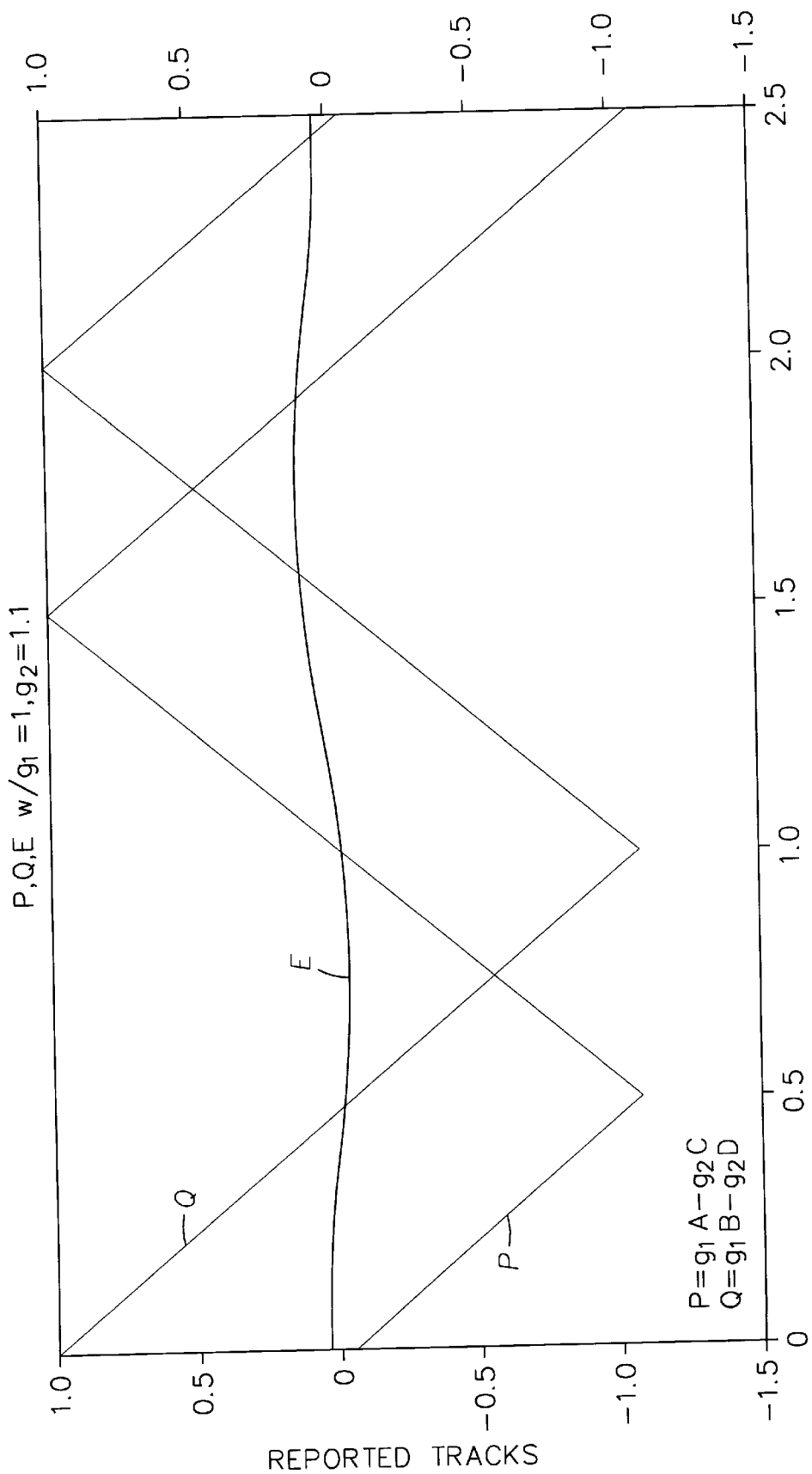
FIG. 15 is a graph that shows what happens with the P and Q servo readback signals of FIG. 3 if the system has a relative gain error between the two frequencies.

FIG. 13 shows the ideal A, B, C, and D signals that would be obtained from the readback head if tracking and processing circuit gain were optimal. The graph of FIG. 13 shows the track location across the horizontal axis and shows the signal amplitude as a fraction of the readback signal maximum value along the vertical axis. FIG. 14 shows the ideal P, Q, and E signals assuming corrected gain values for the two frequencies, as produced by the system illustrated in FIG. 12 using one of the gain calibration methods described above. FIG. 15 shows what can happen if there is a relative gain problem between the two servo pattern frequencies, showing a graph of P and Q values versus the E values. It should be noted that in FIG. 14 the zero crossings of the P and Q do not occur at tracks and half-tracks. That is, the Q signal does not cross the E signal at the 0.5 track point (or at the 1.5 track or 2.5 track points) and the P signal does not cross the E signal at the 1.0 track or 2.0 track points.

Thus, the present invention provides independent, realtime gain control calibration for dual-frequency, dual-burst position error sensing (PES) signals. In the system described above, automatic and independent gain control for each servo burst frequency is achieved using an AGC mapping that determines the approximate head position and performs an appropriate gain calibration for each servo burst frequency. Alternatively, the gain control calibration can implement a normalization scheme. In this way, disk drive systems with dual frequency servo patterns are ensured of accurate automatic gain calibration during signal readback.

The present invention has been described above in terms of presently preferred embodiments so that an understanding of the present invention can be conveyed. There are, however, many configurations for disk storage systems and servo control systems not specifically described herein but with which the present invention is applicable. The present invention should therefore not be seen as limited to the particular embodiments described herein, but rather, it should be understood that the present invention has wide applicability with respect to disk storage systems and servo control systems generally. All modifications, variations, or equivalent arrangements that are within the scope of the attached claims should therefore be considered to be within the scope of the invention.

We claim:

1. A disk drive system having:
   a storage disk with a surface on which is recorded a sequence of servo tracks containing servo pattern bursts comprising a sequence of transitions defining a multiple frequency servo pattern;
   a head that transduces the servo pattern bursts and produces a servo readback signal therefrom;
   an automatic gain control (AGC) mapping means for providing multiple adjustment values, that map to frequencies of the multiple frequency servo pattern;
   a servo channel adapted to perform automatic gain adjustment of the servo readback signal by applying an adjustment value to the servo readback signal for each frequency of the multiple frequency servo pattern to produce a position error sensing (PES) signal from the gain adjusted signal indicative of head position over the magnetic storage media disk; and a servo that moves the head relative to the surface of the storage disk in response to the position error sensing signal to maintain the head centered relative to the servo track.

2. A disk drive system as defined in claim 1, wherein the servo channel uses the multiple adjustment values to adjust the gain of the readback signal in accordance with the approximate position of the head over the storage disk.

3. A disk drive system as defined in claim 2, wherein an adjustment value is determined by detecting calibration tracks recorded on the storage disk.

4. A disk drive system as defined in claim 3, wherein the servo readback signal is repeatedly adjusted until an adjustment threshold limit value is reached between two consecutive adjustments.

5. A disk drive system as defined in claim 2, wherein the multiple adjustment values are determined dynamically during normal operation of the disk drive system.

6. A disk drive system as defined in claim 5, wherein the adjustment value for a track is determined by forming a signal E from servo pattern readback signal values A, B, C, and D, where $$E=(A+C)-(B+D),$$

and by repeatedly adjusting the relative gain value until the absolute value of E is within a predetermined change limit value.

7. A disk drive system as defined in claim 6, wherein the absolute gain value for both frequencies is repeatedly adjusted using a single frequency gain calibration procedure.

8. A servo control system for positioning a magnetic head adjacent a surface of a moving magnetic storage media disk, the system comprising:

a head assembly having at least one read head that reads a servo pattern recorded in multiple tracks on the magnetic storage media disk in a transducing direction and produces a servo readback signal;

an automatic gain control (AGC) mapping means for providing multiple calibration values;

a servo demodulator that receives the servo readback signal and performs automatic gain calibration of the servo readback signal by applying a calibration value to the servo readback signal, independently for each frequency of a plurality of frequencies of the servo pattern, and produces a position error sensing (PES) signal indicative of head position over the magnetic storage media disk; and a servo assembly that is activated to position the head assembly relative to the storage medium; and a servo controller that controls the servo assembly in accordance with the PES signal to maintain the magnetic head centered relative to the servo track width.

9. A servo control system as defined in claim 8, wherein the servo demodulator uses the multiple calibration values to calibrate the readback signal in accordance with the approximate position of the magnetic head over the magnetic storage media disk.

10. A servo control system as defined in claim 9, wherein calibration value is determined by detecting calibration tracks recorded on the magnetic storage media disk.

11. A servo control system as defined in claim 10, wherein the readback signal calibration is repeatedly adjusted until an adjustment threshold limit value is reached between two consecutive adjustments.

12. A servo control system as defined in claim 9, wherein the multiple calibration values are determined by using an in situ method.

13. A servo control system as defined in claim 12, wherein a calibration value for a track is determined by forming a signal E, where $$E=(A+C)-(B+D),$$

and by repeatedly adjusting the relative gain value until the absolute value of E is within a predetermined change limit value.

14. A servo control system as defined in claim 13, wherein the absolute gain value for at least two of the plurality of frequencies is repeatedly adjusted using a single frequency gain calibration procedure.

15. A disk drive controller that receives a readback signal generated by a magnetic head reading a servo pattern on a surface of a moving magnetic storage media disk, demodulates the readback signal to determine the position of the read head relative to a servo track of the storage media disk, and produces a position error sensing (PES) signal to move the read head so as to be centered relative to the width of the servo track, the disk drive controller including:

an automatic gain control (AGC) mapping means for providing multiple calibration values;

a servo demodulator that receives the servo readback signal and performs automatic gain calibration of the servo readback signal by applying a calibration value to the servo readback signal, independently for each frequency of a plurality of frequencies of the servo pattern, and produces a position error sensing (PES) signal indicative of head position over the magnetic storage media disk; and a servo controller that controls a servo assembly in accordance with the PES signal to maintain the magnetic head centered relative to the servo track width.

16. A disk drive controller as defined in claim 15 wherein the servo demodulator uses the multiple calibration values to calibrate the readback signal in accordance with the approximate position of the magnetic head over the magnetic storage media disk.

17. A disk drive controller as defined in claim 16 wherein a calibration value is determined by detecting calibration tracks recorded on the magnetic storage media disk.

18. A disk drive controller as defined in claim 17, wherein the readback signal calibration is repeatedly adjusted until an adjustment threshold limit value is reached between two consecutive adjustments.

19. A disk drive controller as defined in claim 16, wherein the multiple calibration values are determined by using an in situ method.

20. A disk drive controller as defined in claim 19, wherein a calibration value for a track is determined by forming a signal E, where $$E=(A+C)-(B+D),$$

and by repeatedly adjusting the relative gain value until the absolute value of E is within a predetermined change limit value.

21. A disk drive controller as defined in claim 20, wherein the absolute gain value for at least two frequencies of the plurality of frequencies is repeatedly adjusted using a single frequency gain calibration procedure.

* * * * *